Dec. 27, 1966 H. F. SANFORD 3,294,333

TAPE TRANSPORT DRIVE APPARATUS

Filed Aug. 17, 1964

INVENTOR.
HERBERT F. SANFORD
BY Arthur H. Swanson
ATTORNEY.

3,294,333

TAPE TRANSPORT DRIVE APPARATUS

Herbert F. Sanford, Littleton, Colo., assignor to Honeywell Inc., Minneapolis, Minn., a corporation of Delaware Filed Aug. 17, 1964, Ser. No. 389,949
5 Claims. (Cl. 242—55.12)

This invention relates to tape transports. More specifically, the present invention relates to a tape drive system for a tape transport.

An object of the present invention is to provide an improved tape drive system for a tape transport.

Another object of the present invention is to provide an improved tape drive system having an integrated means for mechanical and electrical switching of transport operating modes.

Still another object of the present invention is to provide an improved tape drive system having an integral pinch roller and reel motor control means.

A further object of the present invention is to provide an improved tape drive system having a plurality of modes of operation with simultaneous selection of switching and pinch roller actuation.

A still further object of the present invention is to provide a combined pinch roller and electrical mode switch actuator, as set forth herein, having a simple operation and construction.

In accomplishing these and other objects, there has been provided, in accordance with the present invention, a tape transport drive system having an electrical mode selection switch for manually selecting the mode of operation of reel motors. A cam surface on a switch operating shaft is used to selectively operate a pivoted arm carrying a pinch roller by means of a spring providing a mechanical resilient link between the cam surface and the pivoted arm. The selection of an operating mode of the transport is effective to simultaneously select an appropriate position of the pinch roller with respect to a tape-driving capstan.

A better understanding of the present invention may be had when the following detailed description is read in connection with the accompanying drawings, in which.

Figures 1, 2, 3:
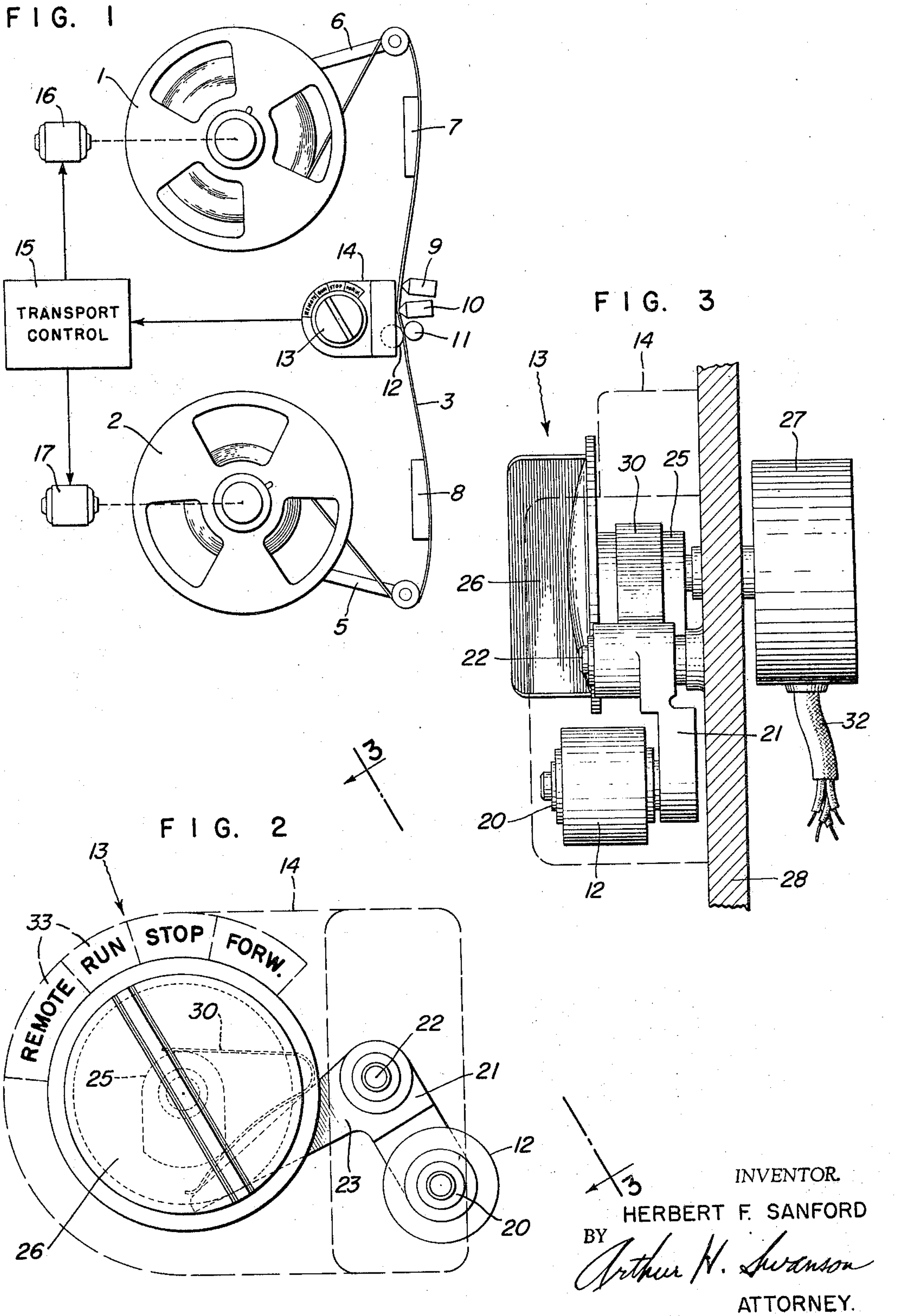
FIG. 1 is a pictorial representation of a tape transport embodying the present invention.
FIG. 2 is a pictorial representation of the combined pressure roller and electrical switch used in the present invention.
FIG. 3 is a side view of the roller and switch shown in FIG. 2.

Referring to FIG. 1 in more detail, there is shown a tape transport having a first supply reel 1 and a second supply reel 2. A tape 3 is disposed in a curvilinear path between the reels 1 and 2 and is supported by a pair of tape tension sensing arms 5 and 6 and a pair of tape guides 7 and 8. The arms and guides are arranged in similar pairs, such as arm 6 and guide 7 and arm 5 and guide 8 on corresponding sides of a pair of magnetic heads 9 and 10 which may be a recording and reading head, respectively. A capstan 11, driven by a motor means, not shown, is used to drive the tape in a predetermined direction between the reels 1 and 2.

A resilient pinch roller 12 is arranged to press the tape 3 against the capstan 11 to impart a driving force to the tape 3. The pinch roller 12 is mechanically operated between a capstan engaging and non-engaging position by a mode selector switch 13 mounted in a housing 14. The switch 13 is also arranged to simultaneously select the mode of operation of the tape transport by providing an electrical switch function for a transport control means 15. The control means 15 is any suitable device for controlling the relative speed and torque of two reel motor, such devices being well-known in the art. Thus, the control means 15 is arranged to control a pair of reel motors 16 and 17 to produce a selective movement of the tape 3. For example, in the embodiment shown in FIG. 1, the switch 13 is operable between four positions labeled, respectively, Remote, Run, Stop and Forward. In the Remote and Run positions of the switch 13, the roller 12 is pressed against the capstan 11 while the control 15 is operated to energize the reel motors 16 and 17 as tensioning motors wherein they are driven in opposite directions to tension the tape 3. In the Stop position, the roller 12 is disengaged from the capstan 11 and the motors 16 and 17 are deenergized. In the Forward position of switch 13, the roller 12 is still disengaged from the capstan 11 but one of the reel motors is energized to provide a rapid reeling of the tape 3. It is obvious that additional positions of the switch 13 may be provided for further modes of operation of the tape transport. For example, a Reverse position would provide a disengaged roller 12 and an energized reel motor opposite to the motor energized during a Forward mode of operation. Further, the mode designations on the housing 14 may be illuminated by appropriate means to respond to the positions of the switch 13 to visually indicate the mode selected.

The details of the structure of the switch 13 are shown in FIGS. 2 and 3 which are pictorial representations of the switch 13 and pinch roller 12. The roller 12 is rotatably mounted on a bearing 20 on one end of a roller arm 21. The arm 21 is centrally pivoted on a pivot 22. The other end of the arm 21 is arranged as a ramp-like extension 23. The extension 23 is disposed near a cam-shaped shaft 25, which shaft extends between a front knob 26 of the switch 13 and an electrical switching device 27 on the other side of transport mounting panel 28. A leaf spring in the form of a hairpin spring 30 is mounted with one leg between the extension 23 and the cam-shaft 25 to provide a resilient mechanical connection between the extension 23 and the cam-shaft 25. In other words, the spring 30 is effective to transmit any displacement of the outer surface of the cam-shaft 25 to the extension 23. The other leg of the spring 30 is disposed on the other side of the cam-shaft 25 while the U-shaped end of the spring 30 is fastened to the extension 23 at a point near the pivot 22. The switch means 27 may be provided with an appropriate electrical cable 32 for connection to the transport control 15. The cover 14 is provided with suitable nameplates 33 to indicate the mode positions of the knob 26.

In operation, the knob 26 is rotated to a desired mode position. This rotation is effective to operate the switch 27 to affect the transport control 15, as described above, and to produce a corresponding appropriate motion of the roller 12 on the arm 21 by means of cam-shaft 25. For example, assume the knob 26 is rotated to the Run position, as illustrated in FIG. 2. In this position, the spring 30 is expanded by moving an eccentric surface of the cam-shaft 25 having a large radius in contact with the legs of the spring 30. This expansion of the spring 30 is effective to pivot the arm 21 around pivot 22 and press the roller 12 against the capstan 11.

Conversely, when the knob 26 is rotated to a Stop position, a surface of the cam having a smaller radius is brought in contact with the legs of the spring 30. This position of the cam-shaft 25 is effective to allow the spring 30 to contact and to move the roller 12 out of engagement with the capstan 11. It may be seen that in any position of the knob 26, the spring 30 is effective to produce a positive displacement of the roller 12 while allowing a resilient coupling between the roller 12 and the cam-shaft 25 to absorb any irregularities in the thickness of the tape 3 and roller 12, and variations in the positions of the component parts.

Accordingly, it may be seen that there has been provided, in accordance with the present invention, an improved tape transport pinch roller and capstan apparatus for effecting different modes of operation of the transport and pinch roller while having means for absorbing mechanical irregularities in the motion of the tape and pinch roller.

What is claimed is:

1. A combined pinch roller and web transport control switch having a plurality of operating modes comprising an electrical switch having an operating shaft with a cam-shaped surface thereon for mode selection, a pivoted arm carrying a pinch roller on one end thereof, and leaf spring means responsive to movement of said cam surface and disposed between said cam surface and the other end of said pivoted arm to produce predetermined displacements of said pivoted arm during mode selection thereby absorbing rotational irregularities associated with said pinch roller when said pinch roller is in an operative position.

2. A combined pinch roller and web transport control switch comprising an electrical switch having an operating shaft with a cam-shaped surface therein, a pivoted arm carrying a pinch roller on one end thereof, and means responsive to said cam surface including a hairpin spring having one leg partially encircling said cam surface and the other leg disposed between said cam surface and said pivoted arm and means fastening a U-shaped end of said spring on said other end of said pivoted arm to produce predetermined displacements of said pivoted arm.

3. A tape transport system comprising a pair of tape storage reels, a tape driving capstan arranged between said reels, a pair of reel motors connected to respective ones of said reels, a tape transport control means connected to said reel motors to operate said motors in a plurality of predetermined modes, a mode selector switch connected to said transport control to select said modes, an operating shaft for said switch having a cam-shaped surface thereon, a pivoted arm carrying a pinch roller on one end thereof in an operative relationship with said capstan, and leaf spring means responsive to movement of said cam surface and disposed between said cam surface and the other end of said pivoted arm to produce predetermined displacement of said arm to engage and disengage said roller with said capstan thereby absorbing rotational irregularities when said roller is in operative relationship with said capstan.

4. A tape transporting system comprising a pair of tape storage reels, a tape driving capstan arranged between said reels, a pair of reel motors connected to respective ones of said reels, a tape transport control means connected to said reel motors to operate said motors in a plurality of predetermined modes, a mode selector switch connected to said transport control to select said modes, an operating shaft for said switch having a cam-shaped surface thereon, a pivoted arm carrying a pinch roller on one end thereof in an operative relationship with said capstan, and means responsive to said cam surface including a hairpin spring having one leg partially encircling said cam surface and the other leg disposed between said cam surface and said pivoted arm and means fastening a U-shaped end of said spring on said other end of said pivoted arm to produce predetermined displacement of said arm to engage and disengage said roller with said capstan.

5. A web drive control for moving a web between storage means comprising control means operative to select one of a plurality of operating modes of a web drive, switching means for said control means to effect a selection of said operating modes, cam means connected to said switching means, pinch roller means, pinch roller support means having an extended portion oppositely disposed from said roller and operative to position said pinch roller in an operative relationship with said web, and U-shaped spring means operative to provide a resilient mechanical link between said cam means and said extended portion of said pinch roller support means to affect said operative relationship of said roller with said web.

References Cited by the Examiner

UNITED STATES PATENTS

| | | | |
|---|---|---|---|
| 2,751,438 | 6/1956 | Baer. | |
| 2,873,318 | 2/1959 | Moore | 242—55.12 X |
| 3,087,686 | 4/1963 | Wren | 242—55.13 |
| 3,093,335 | 6/1963 | Lane | 242—55.12 |

FRANK J. COHEN, *Primary Examiner.*

GEORGE F. MAUTZ, *Examiner.*